June 28, 1949.   J. HAANTJES ET AL   2,474,666
CIRCUIT-ARRANGEMENT FOR PRODUCING A SAW-TOOTH CURRENT
IN THE DEFLECTION COIL OF A CATHODE-RAY TUBE AND FOR
PRODUCING A DIRECT VOLTAGE FOR THIS TUBE
Filed March 26, 1948

INVENTORS
JOHAN HAANTJES &
BERNARDUS WILLEM VAN INGEN
BY
Fred M Vogel
AGENT

Patented June 28, 1949

2,474,666

UNITED STATES PATENT OFFICE 2,474,666

CIRCUIT ARRANGEMENT FOR PRODUCING A SAW-TOOTH CURRENT IN THE DEFLECTION COIL OF A CATHODE-RAY TUBE AND FOR PRODUCING A DIRECT VOLTAGE FOR THIS TUBE

Johan Haantjes and Bernardus Willem van Ingen Schenau, Eindhoven, Netherlands, assignors to Hartford National Bank and Trust Company, Hartford, Conn., as trustee Application March 26, 1948, Serial No. 17,156
In the Netherlands April 21, 1947

1 Claim. (Cl. 315—27)

This invention relates to a circuit-arrangement for producing a sawtooth current in a deflection coil of a cathode-ray tube, which coil is connected to the secondary winding of a transformer, part of the primary winding of this transformer being connected into the anode circuit of a discharge tube to which a sawtooth voltage is supplied and with which anode circuit a diode is connected in parallel in such manner that the diode is conductive during the upstroke of the sawtooth current, in which arrangement, moreover, the voltage pulses set up throughout the primary winding of the transformer are rectified for producing a direct voltage feeding a cathode-ray tube.

Figure 1:
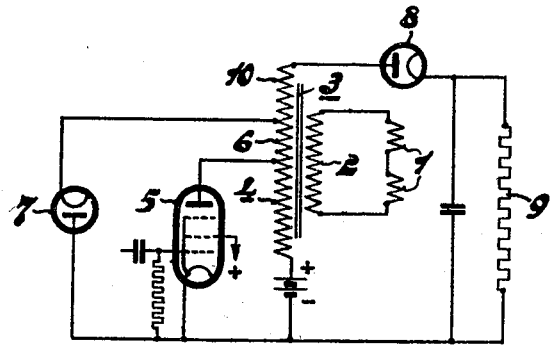

A known circuit-arrangement of this type is shown in Figure 1.

The deflection coils 1 of a cathode-ray tube are coupled to the secondary winding 2 of a transformer 3. The part 4 of the primary winding of the transformer is included in the anode circuit of a discharge tube 5. The control-grid circuit of this tube has supplied to it a sawtooth voltage which may, for instance, be taken from a blocking oscillator. In parallel with the anode circuit of the discharge tube 5 is connected a circuit which comprises in series a part 6 of the primary transformer winding and the diode 7.

Furthermore, the voltage pulses occurring all over the primary winding of the transformer are rectified by means of a rectifier 8 and the direct voltage thus produced is supplied to the anode of the cathode-ray tube, of which the internal resistance 9 is depicted in the drawing.

The operation of such a circuit arrangement is known so that it need not be described in greater detail. It is only to be noted that the part 10 of the primary transformer winding is provided for attaining the desired high direct anode voltage for the cathode-ray tube, as a result of which any further voltage multiplication arrangements can mostly be dispensed with. The primary transformer winding and consequently also the part 10 should be so wound as to have as low a capacity as possible, since the fly-back time of the sawtooth current traversing the coils 1 is determined by the natural period of oscillation of the available inductance and capacities.

In the case of the transformer windings having a low capacity the spreading inductances between the turns are comparatively high. It has now been found that during the up-stroke of the sawtooth current traversing the coils 1 disturbing oscillations occur in this current. These oscillations prove to originate from oscillations appearing in the part 10 of the primary winding, which part still exhibits a certain spreading with respect to the remaining part consisting of parts 4 and 6.

In the absence of this spreading there would not occur troublesome disturbances in the deflection current since, as is well known, the voltage across the part 4 plus 6 of the primary winding during the up-stroke of the sawtooth current remains constant owing to the presence of the diode 7.

The circuit-arrangement according to the invention, in which this disadvantage is avoided, exhibits the feature that the transformer comprises a core of magnetic material on which is provided the secondary transformer winding which extends only over part of the length of the core and on the outside of which is provided the primary low-capacity winding which extends over a greater length than the secondary winding, the location of the secondary winding with respect to the separation between the primary winding part included in the diode circuit and the part not included therein being chosen to be such that the inductive coupling of the secondary winding with the spreading inductance of these two parts is zero or substantially zero.

Owing to the absence of the said coupling the disturbing oscillations originating from the part 10 of the primary winding no longer find their way to the secondary winding 2 of the transformer.

Figure 2:
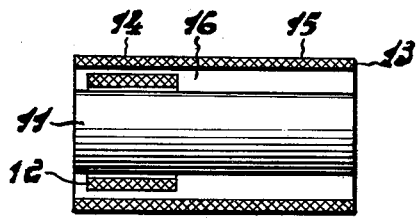

Figure 2 represents a transformer of this type.

The secondary winding is shorter than the cylindrical core 11 of magnetic material provided around this core. Around this winding is provided the low-capacity primary winding 13 of which the left-hand part 14 corresponds with the parts 4 and 6 shown in Figure 1 i. e. the part included in the diode circuit. The right-hand part 15 corresponds with the part 10 shown in Figure 1. The location of the winding 12 is so chosen with respect to the separation 16 between both parts of the primary winding that the coupling of the winding 12 with the spreading inductance of the winding 15 with respect to the winding 14 is equal to zero or substantially zero.

What we claim is:

A circuit-arrangement for producing a sawtooth current in a deflection coil of a cathode-ray tube, which coil is connected to the secondary winding of a transformer, part of the primary winding of this transformer being connected into the anode circuit of a discharge tube to which a sawtooth voltage is supplied and with which anode circuit a diode is connected in parallel in such manner that the diode is conductive during the up-stroke of the sawtooth current, in which arrangement, moreover, the voltage pulses set up throughout the primary winding of the transformer are rectified for producing a direct voltage feeding a cathode-ray tube, characterized in that the transformer comprises a core of magnetic material on which is provided the secondary transformer winding which extends only over part of the length of the core and on the outside of which is provided the primary low-capacity winding which extends over a greater length than the secondary winding, the location of the secondary winding with respect to the separation between the primary winding part included in the diode circuit and the part not included therein being chosen to be such that the inductive coupling of the secondary winding with the spreading inductance of these two parts is zero or substantially zero.

JOHAN HAANTJES.
BERNARDUS WILLEM van INGEN
SCHENAU.

No references cited.